US005171497A

United States Patent [19]

Osada

[11] Patent Number: 5,171,497

[45] Date of Patent: Dec. 15, 1992

[54] METHOD FOR PRODUCING A PANEL FOR APPLYING TO A BUILDING

[76] Inventor: Hideharu Osada, 12-1, Tomiokita 2-chome, Nara-shi, Nara, Japan

[21] Appl. No.: 591,725

[22] Filed: Oct. 2, 1990

[30] Foreign Application Priority Data

Oct. 12, 1989 [JP] Japan ................................ 1-265384

[51] Int. Cl.[5] .......................... B29C 39/10; B32B 3/14

[52] U.S. Cl. .................................... 264/112; 264/256; 264/DIG. 31; 264/DIG. 57

[58] Field of Search ....... 264/112, 256, 333, DIG. 57, 264/DIG. 31

[56] References Cited

U.S. PATENT DOCUMENTS 1,809,504 6/1931 Carvel ................................ 264/256
1,856,906 5/1932 Carvel ................................ 264/256
2,890,492 6/1959 Smith ................................ 264/256
3,378,617 4/1968 Elmendorf ........................... 264/256
3,390,496 7/1968 Weiner et al. ...................... 264/256
3,496,264 2/1970 Grant ................................ 264/256
4,466,937 8/1984 Johnston et al. .................... 264/256
4,784,821 11/1988 Léopold ............................ 264/510
4,915,888 4/1990 Sato ....................................... 264/71

*Primary Examiner*—Mary Lynn Theisen
*Attorney, Agent, or Firm*—Darby & Darby

[57] ABSTRACT

A method for manufacturing a panel in which a base sheet having adhesive or all or selected parts of a surface thereof. Small stones are applied to the base sheet and a water absorbing polymer is also applied. A hardening material, such as center, is spread over the stones and the polymer. The polymer absorbs the water of the cement and expands. It is thereafter washed off or allowed to evaporate.

9 Claims, 6 Drawing Sheets

FIG.1(a)
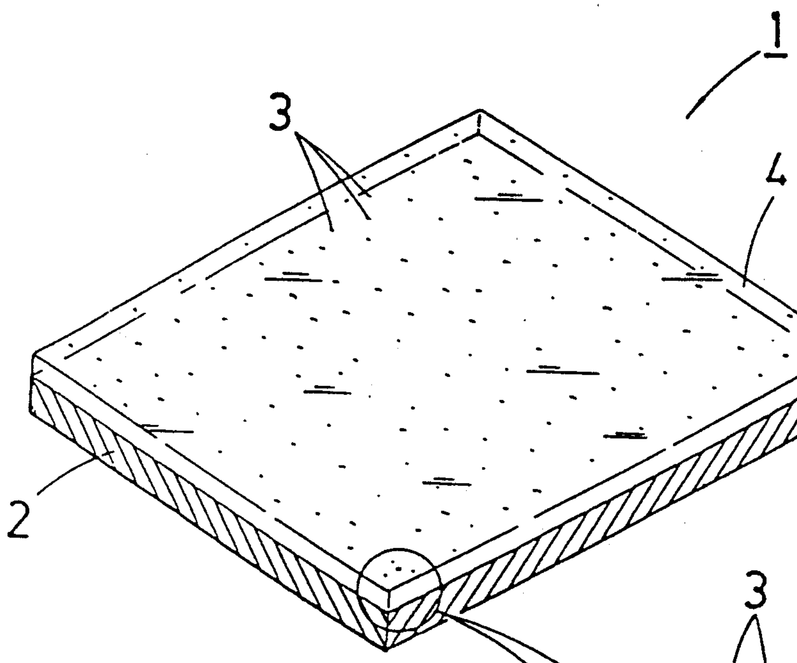
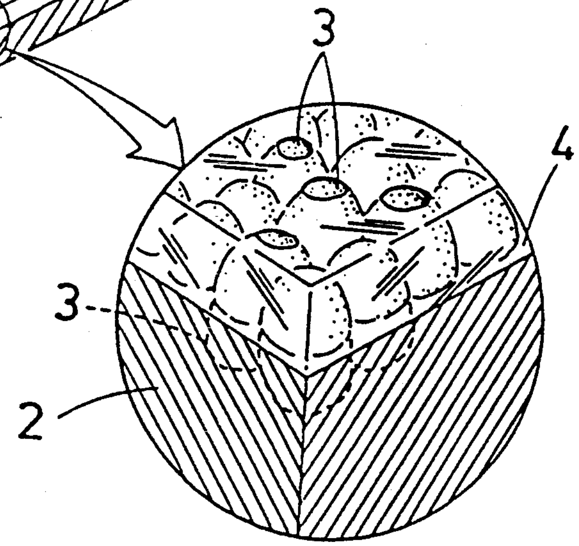
FIG.1(b)

METHOD FOR PRODUCING A PANEL FOR APPLYING TO A BUILDING

BACKGROUND OF THE INVENTION

This invention relates to a panel for applying to a building and a method for producing the same.

Conventionally there are various methods for treating surface of a building, such as laying tiles, applying a synthetic resin finish and the like. Among them, a method for applying small stones to the whole surface to be treated is preferred in view of the decorative appearance and durability. For example, these methods include so-called "aggregate exposed finish by washing", "aggregate exposed finish by scraping" and the like, wherein a mixture of cement and aggregate is troweled on a wall surface foundation, and then the cement is washed off or scraped away by a wire brush. There is also a "sprayed finish", wherein sticky paint is coated on a wall surface and an aggregate is sprayed thereon to harden.

The above-mentioned conventional methods are conducted not only with objects for practical use, such as giving durability, preventing sliding, but also for giving a decorative appearance and being thick and heavy to provide protection for the building.

However, there are some disadvantages to these methods in that it is difficult to treat surfaces indoors due to using water in the aggregate exposed finish by washing. Also, the aggregates fall off in the lower portion of the surface to be treated due to the flow of too much water. In the process of aggregate exposed finish by scraping, debris is produced and the decorative appearance is lessened. Both finishes require substantial manual labor to be effective, require comparatively high level technology, and are expensive.

Furthermore in the spraying finish, sticky paint was used originally from a view point of preventing cracking of the wall surface treated. However, spraying of the aggregate such as sand is done in advance to prevent dust and the like from adhering to the painted surface. Therefore, a spraying type finish is preferable for a large scale treatment, but the adhesiveness of the paint is not so strong so that it is difficult to adhere the aggregate uniformly. There still are disadvantages in that loss of the aggregate is caused up to about 30% by aggregate particles colliding with each other, and the place to be treated is limited due to the noise and dust produced.

Scattering of sand is also used on asphalt or concrete while it is still soft for preventing sliding. Here, however, the finish is uneven or the adhering is not complete enough to obtain a satisfactory effect.

A dry process may be used in which cement products and the like have small stones adhered thereon during manufacture in a factory, or laid and adhered at a job site. In this process, small stones are spread over a frame base and cement is poured thereon and hardened in the shape of the frame. This forms a product having only end portions of the small stones exposed. The surface of product, after being hardened, does not have a pleasing appearance like the aggregate exposed finish by washing. That is, the cement enters not only the space between the frame base and the small stones, but also in the spaces between the small stones.

Also, in a process which involves placing the small stones on the cement poured in the frame before hardening, since there are some buried small stones, it is difficult, if not impossible, to arrange and level the small stones exposed surfaces.

Recently, a decrease of working at a job site is required from the viewpoint of problems such as shortening of the working period, environmental contamination and the like.

Accordingly, a panel for application at the job site which is able to be treated simply in dry process and to have durability and decorative appearance like in the aggregate exposed finish by washing process has been required.

SUMMARY OF THE INVENTION

A first object of the invention is to provide a panel having a plurality of small stones and water absorption polymer on a base surface of inorganic hardening material, the panel forming an aggregate exposed type finish by washing merely by attaching the panel to the surface to be treated.

A second object is to provide a simple method for producing a panel to accomplish the above-mentioned object comprising placing a plurality of small stones and a water absorption polymer on an adhesive sheet, then coating the mixture with an inorganic hardening material, such as cement, in a predetermined thickness and drying it.

A third object is to provide a method for producing a panel comprising placing a plurality of small stones and water absorption polymer on a bottom plate within a frame member which can be removed so that they cover partial or almost the whole surface of the bottom plate, then coating the mixture with an inorganic harding material, such as cement, in a predetermined thickness and drying it, and removing the frame member.

BRIEF DESCRIPTION OF THE DRAWINGS

FIG. 1 is a perspective view showing an example of a panel made according to the invention for applying to a building.

DETAILED DESCRIPTION OF THE INVENTION

Figure 2:
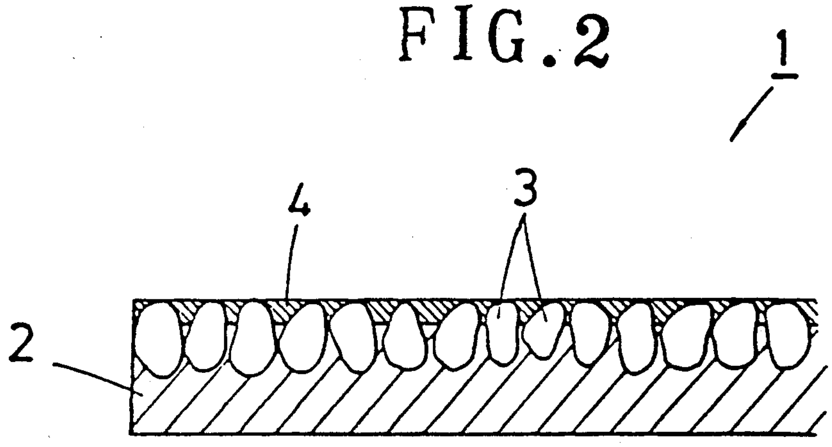
FIG. 2 is a sectional view thereof.

"Building" in this specification indicates inner and outer surfaces of a general building, a gate post, a fence, a passage, a swimming pool side, a general road and other various structures.

"Applying" here is used as a concept including placing, fixing, adhering and the like.

"A panel" here includes not only flat plate such as a PC panel (precast concrete panel) and ALC panel (autoclaved lightweight concrete panel), but also block form structures including interlocking blocks.

"An inorganic hardening material" is a cement type material, but it is not limited to the type and it is satisfactory if its main part is inorganic and hardened time-passingly.

"Small stones" used here are not only natural stones but also crushed ceramics. Stones with various colors can be used, preferably at random. It is preferable to use stones of diameter of about 1 to 10 mm. Any shape of the small stones is acceptable, but granules are preferably used from the view point of decorative appearance.

"Water absorption polymer" is a polymer swelled by absorbing water and the ingredients thereof is not especially critical. As examples, there are neutralization substances of isobutene-maleic anhydride copolymer cross-linking substance and of vinyl acetate acrylic acid graft copolymer, sodium polyacrylate cross-linking substance, unsaturated sulfonic acid copolymer and the like. These materials expand their volume over ten or more times by swelling.

Furthermore, said absorption polymer can be used both in liquid form and powder form, but usually powder is applied.

"Water absorbed condition" means a condition which said powdery polymer absorbs moisture causing it to expand.

"Small stones and a polymer are adhered to a hardening material" means that the small stones and the polymer are adhered exposing themselves on at least the surface of the hardening material. It means not only that the hardening material is coated only on the surface, but also that some small stones may be buried. That is, it is enough that some stones are exposed.

Furthermore, once the stones are applied, a sheet (including film) may be used on the exposed surface. Plastic sheet is preferably used, but paper or sheets of other material may be used. Various film types and plate types are used, such as various plastic film and nylon sheet, tetolon (polyester), polyolefin such as polyethylene and polypropylene, polyvinyl chloride, and sheets of foam material thereof. Cloth and papers such as craft paper, cardboard and synthetic paper are also usable. Among them, flexible film and cloth, particularly foam sheet, is preferable in adhering power. Transparent sheet material is preferable so that the color and kind of the panel can be distinguished from the surface. The sheet (film) having adhesiveness is still preferred so that the panel production is easier.

The water absorbed by the polymer may be washed off from the panel by water. The water of the polymer may also be removed by vaporizing naturally instead of washing off. In this way, the small stones are embossed on the panel.

The finished panel may have any shape, such as an interlocking block or a triangle. A rectangular flat plate is generally preferred.

The panel part to which the small stones are adhered does not always mean the entire surface of the cement. It is possible to adhere the stones on a part of the panel. The panel can have a pattern with a joint portion like pattern preferably used.

A method for manufacturing the panel is described below.

At first a base sheet having adhesiveness (plastic is preferred) is provided and the small stones and powdery polymer are applied thereon. At this time, the applying is conducted so as to cover almost the entire surface of the base sheet. The grain size of the polymer powder is smaller than the small stones, so that the powder polymer is spread after placing the small stones on the surface of the base sheet.

Then an inorganic hardening material, such as cement, is spread in a certain thickness (different from that of the panel) on said powder polymer and small stones. When the hardening material is cement is spread it includes water and the absorption polymer absorbs the water and expands. The coefficient of the polymer expansion may be 100 to 1000 times. The polymer expansion prevents the cement and the like from permeating the clearance spaces between the stones applied, and thereby the stones do not become buried in the cement.

When the cement is hardened after filling the spaces around the small stones, most of the surface area of the small stones on the panel surface are covered. After hardening, only the tip part of each small stone is visible. Accordingly, the object to make the appearance decorative by spreading the small stones on the panel surface can not be accomplished. In this invention, the surface of the small stones is protected by water absorption polymer. Since the polymer has expanded several hundred times, it does not penetrate the cement. The polymer can be either washed out or left as it is in a state of long time drying. When it is left as it is, the water is removed (evaporates) naturally to return the polymer to its original powdery form.

In other words, even if the polymer protects the stones, a part of each stone is fixed to the base sheet with the cement. For this purpose, the proper amount of the powdery polymer should be selected of a polymer having proper coefficient of expansion if chosen. Practically trial and error is repeated. According to experiments, it is preferable to have about ⅗ of each stone buried in the cement.

In this way, the panel according to the invention is completed by pouring the cement and hardening by drying.

By using an adhesive substance on a special part (pattern or the like) of the base sheet, it is possible to place the small stones and powdery water absorption polymer only on the adhesive part. Therefore, the part of the base sheet which does not have the small stones and powdery polymer has the cement exposed on the surface. Thus, various patterns can be expressed.

Furthermore, there is a process variation using the adhesive base sheet comprising placing powdery polymer on the sheet at first, removing the excess powdery polymer which is not adhered on the part of the base sheet without adhesive, spreading small stones on the whole surface of the base sheet and coating the base sheet with the hardening materials such as cement. By this process, the part of the base sheet to which the powdery polymer is not adhered has the small stones thereon, but penetrating of the cement does not occur because the powdery polymer does not exist. Thus, the exposed stones on the base sheet area without the polymer are held by the cement to a lesser extent to make a pattern as well.

In the case that it is difficult to coat adhesive to only the special part of the base sheet, a peelable pattern punching sheet is fitted to the entire surface of adhesive-coated base sheet. The powdery polymer or small stones are placed thereon and adhered to the adhesive, and then said pattern punching sheet is peeled to easily give a panel adhered small stones or the like on the special part of the special part of the sheet.

It is possible to manufacture a panel by disposing a frame around the base sheet, but it is easier and more convenient if a frame is used manufactured of block or concrete flat plate.

Further, without using the above-mentioned base sheet it is possible to manufacture the panel by placing the small stones and water absorption polymer on a peelable plate or frame material having bottom (a frame used when a simple box or a block is manufactured) and spreading or pouring cement or the like. For example, after placing small stones and water absorption polymer in a frame of interlocking blocks the usual manufacturing process is conducted to give a panel of interlocking blocks whose surface is covered by the small stones and whose appearance is highly decorative.

In this way, in the case of placing the small stones and water absorption polymer in the frame or the like directly, the water absorption polymer need not be not powdery but can be a liquid. The water absorption polymer liquid is first sprayed or coated on the bottom of a frame, small stones are placed thereon, or reversely after placing small stones, the polymer is sprayed or coated.

A base sheet on which is sandwiched powdery water absorption polymer with paper can be used.

A method to use the panel according to the invention is described below.

In the case that the panel (having a plastic sheet on the surface thereof) is fitted on a pavement, a block form panel according to this invention is fitted on the pavement whose underlying base is suitably graded. At this time, cement or mortar may be spread and hardened at the lower portion of the base sheet. Then the plastic sheet on the surface is peeled. A polymer which exists on the surface and absorbs water is washed out by water. If the panel is already washed out, the last washing process is not necessary.

EMBODIMENT

The present invention is described in detail based on embodiments shown in drawings.

FIG. 1 is a perspective view showing an embodiment of a panel 1 for applying to a building according to the present invention. Small stones 3 are adhered to the entire surface of a concrete base sheet part 2, water absorption polymer 4 in a water absorbing state exists in gaps between the stones and on an upper part of the small stones 3. The diameter of the small stone in this embodiment is about 5 mm to 10 mm. FIG. 2 is a sectional view thereof. The figure illustrates a relation between the small stones 3 which are partially buried in the concrete portion 2 and the water absorption polymer 4 which covers the small stones.

Figure 3:
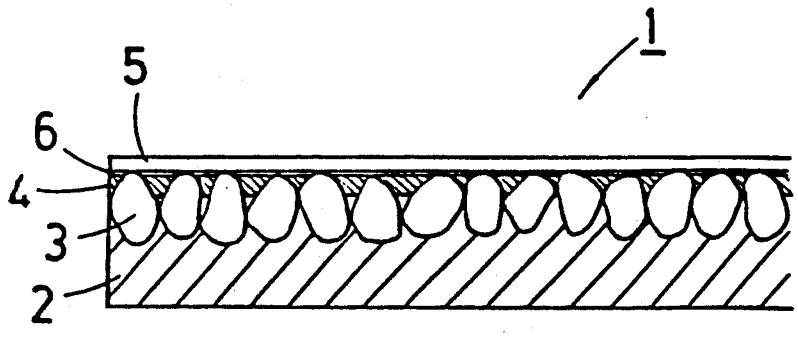
FIG. 3 is a sectional view illustrating a plastic sheet added to the surface of the panel of FIG. 1.

FIG. 3 shows an embodiment in which a plastic cover sheet 5 is applied on the surface of the panel 1 of the embodiment of FIG. 1. An adhesive layer 6 is formed on the back surface of the plastic sheet 5, so that the plastic sheet 5 is adhered with the small stones 3 and the water absorption polymer 4 in a water absorbed state. In this embodiment, preferably a rubber adhesive is coated in a thickness of about 40 $\mu$ to be the adhesive layer 6. Nylon film is used for the plastic cover sheet 5.

As the adhesive, rubber, acrylic, vinylic and various plastic ones are all usable, but those with strong adhesiveness is preferable.

Figure 4:
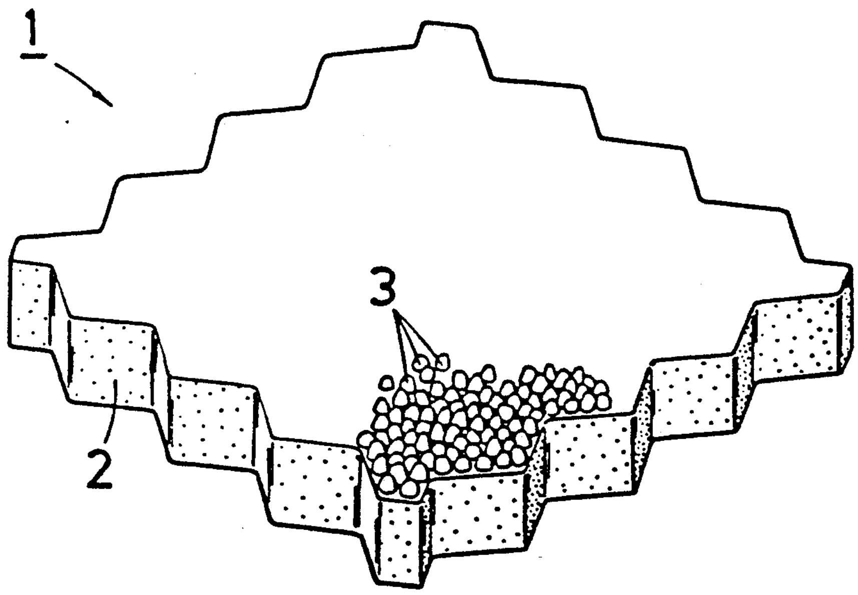
FIG. 4 is a perspective view of a panel having an irregular shape made according to the invention.

In FIG. 4 a panel 1 having an irregular shape is shown. In this embodiment, the panel 1 is constructed as an interlocking block. The illustrated panel 1 for applying to a building originally has the water absorption polymer 4 and plastic sheet 5. This is because this embodiment shows a state that the plastic cover sheet is peeled off at the job site of applying the panel 1 and the water absorption polymer 4 is washed out. It is not limited at what step in an applying work, the plastic sheet 5 is peeled or the water absorption polymer 4 is removed positively.

Figure 5:
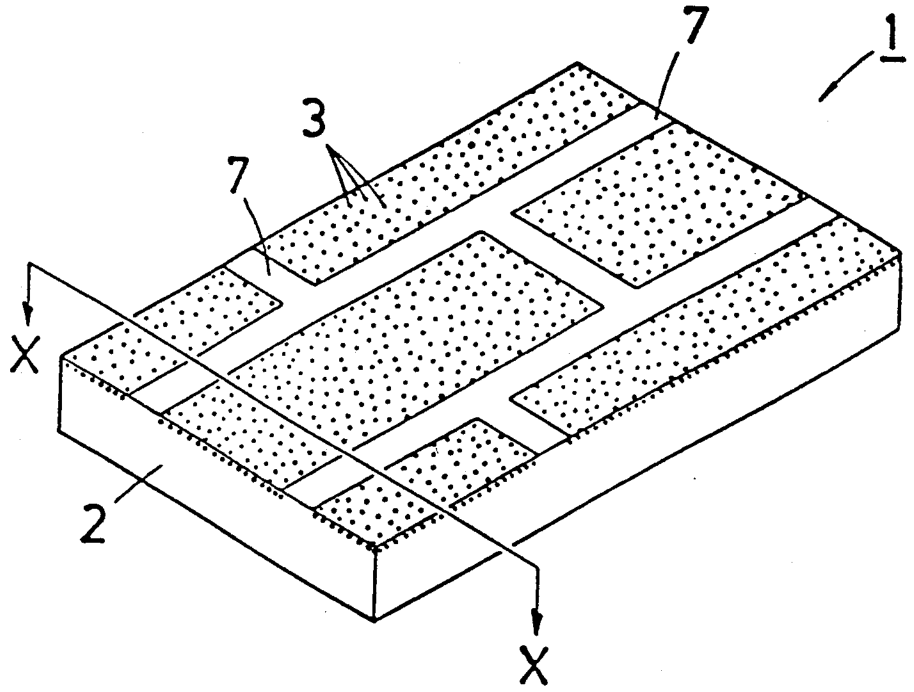
FIG. 5 is a perspective view showing another type of a panel.
Figure 6:
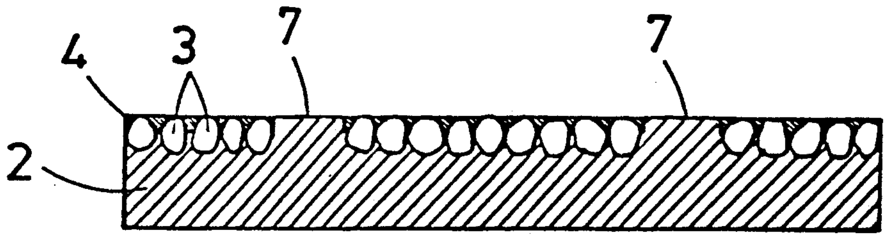
FIG. 6 is a sectional view along line X—X of FIG. 5, FIGS. 7 (*a*), (*b*), (*c*), (*d*) and (*e*) are outline and sectional views showing the steps of the method of producing the panel for applying to a building according to the invention.
Figure 7A:
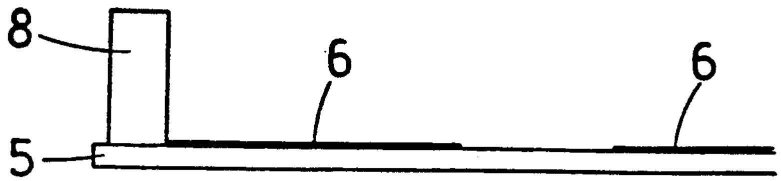
Figure 7B:
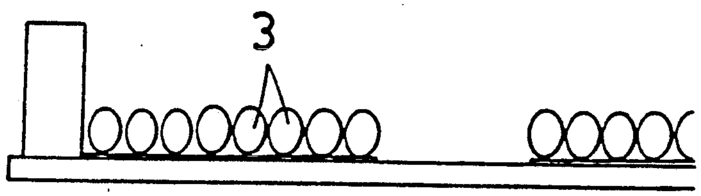
Figure 7C:
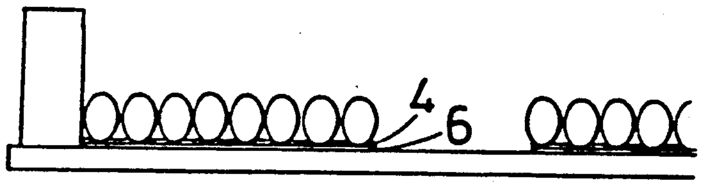
Figure 7D:
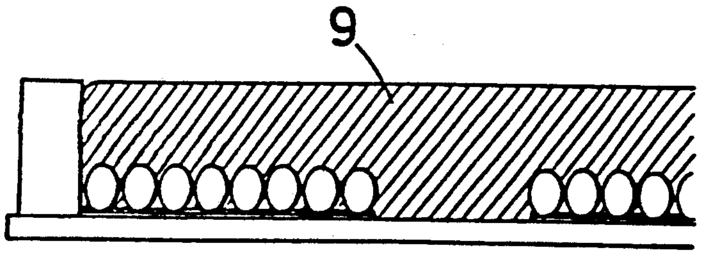
Figure 7E:
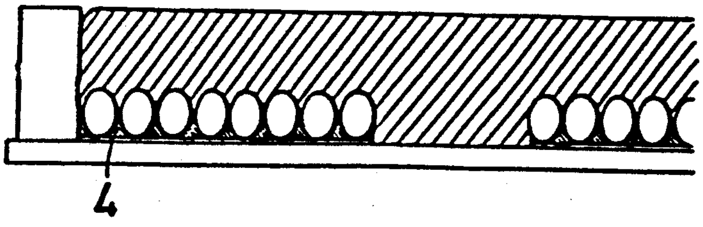

In FIG. 5, the small stones 3 are adhered not wholly but partially. That is, there are no small stones 3 at the joint portion 7 to give a pattern. This is produced by the previously mentioned simple process conducted without coating the adhesive at the joint portion 7. FIG. 6 is a sectional view of X—X in FIG. 5. It is clear that there are no small stones 3 on the joint portions 7 and there is cement to the surface.

FIG. 7 (*a*) to 7(*e*) are drawings showing the process for manufacturing the panel according to the invention. FIG. 7 (*a*) is a sectional view showing the plastic base sheet 5 coated partially with the adhesive 6. A mold 8 is a simple frame provided to prevent cement and the like from flowing out. FIG. 7 (*b*) illustrates a state that small stones 3 are placed on the coated base sheet, then small stones which are not adhered to the base sheet by the adhesive 6 are removed. The removal of the small stones 3 is easy since the small stones 3 fall off by gravity when inclining the plastic sheet 5. FIG. 7 (*c*) illustrates a state that powdery polymer which is not adhered by the adhesive 6 is removed after coating the powdery water absorption polymer 4. FIG. 7 (*d*) illustrates a state that cement 9 is poured in the mold over the stones. The cement is poured and the water of the cement is absorbed by the water absorption polymer to swell largely in a state that the polymer itself partially covers the small stones 3. As a result, it prevents the cement 9 from penetrating into gaps between the small stones 3.

Furthermore, the entire surface of the plastic base sheet 5 is coated with the water absorption polymer 4, the small stones are placed so that the stones 3 are removed partially, and then the same process is applied to manufacture a panel.

Figure 8:
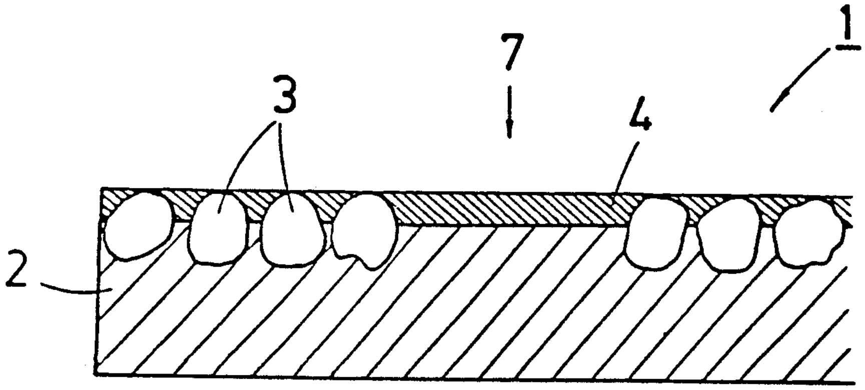
FIGS. 8 and 9 are outline sectional views showing other examples of panels made according to the invention.

As shown in FIG. 8, a part of the base sheet does not have the small stones 3 to give a panel having recesses in the area where there are no stones.

Figure 9:
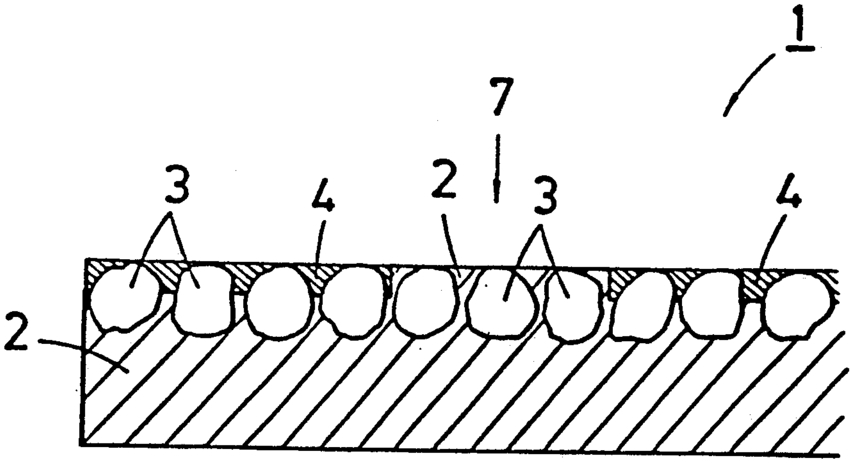

On the contrary, the small stones 3 are placed on the entire surface and the water absorption polymer 4 is partially coated to be able to make a pattern such as joint portion by constructing a portion on which the small stones 3 are visible and a portion on which the stones 3 are almost not visible as shown in FIG. 9.

In these embodiments, the plastic base sheet 5 and a mold frame 8 are used, but the same process may be conducted with a frame to manufacture block and the like may be used.

EFFECTIVENESS

As mentioned above in detail, the present invention provides a structure of a panel and a method for producing the same wherein the volume expansion by absorbing water in a water absorption polymer is utilized in order to finish the small stones like an aggregate exposed finish by washing. The invention produces various results mentioned below.

1. For finish work, applying panels or placing them is enough to shorten the work period and make the working simple.
2. For manufacturing the panel, it is not necessary to remove excessive cement in order to expose the small stones on the surface of cement and the like.

3. Swelled (expanded) water absorption polymer can be either left as it is, or easily removed if it is to be removed.

What is claimed is:

1. A method for manufacturing a building panel comprising:

providing a base sheet having adhesive on at least a portion thereof, applying a plurality of small stones to said base sheet which adhere to the adhesive, applying a water absorbing polymer to said stones and the spaces therebetween, spreading an inorganic hardening material including water over said stones to a desired thickness, and drying the hardening material, the polymer absorbing water from the hardening material and expanding to prevent the stones from becoming buried in the hardening material.

2. The method of claim 1, further comprising the step of removing the polymer.

3. The method of claim 2, wherein the step of removing the polymer is accomplished by washing.

4. The method of claim 2, wherein the step of removing the polymer is accomplished by evaporation.

5. A method for manufacturing a building panel comprising:

providing a frame having a bottom base, placing a plurality of small stones and a quantity of water absorbing polymer on said bottom base, applying an inorganic hardening material including water over said stones and into the base in the spaces between the stones, and drying the hardening material, the polymer absorbing water from the hardening material and expanding to prevent the stones from becoming buried in the hardening material.

6. The method of claim 5 further comprising the step of removing the polymer.

7. A method according to claim 5, further comprising the step of removing the frame.

8. The method of claim 6, wherein the step of removing the polymer is accomplished by washing.

9. The method of claim 6, wherein the step of removing the polymer is accomplished by evaporation.

* * * * *